(12) United States Patent
Fuller et al.

(10) Patent No.: US 9,970,535 B1
(45) Date of Patent: May 15, 2018

(54) LINEAR PACKAGE FOR A TWO-STAGE CONTROL MICROVALVE

(71) Applicant: DunAn Microstaq, Inc., Austin, TX (US)

(72) Inventors: E. Nelson Fuller, Manchester, MI (US); Parthiban Arunasalam, Austin, TX (US); Joe A. Ojeda, Sr., Austin, TX (US)

(73) Assignee: DUNAN MICROSTAQ, INC., Austin, TX (US)

( * ) Notice: Subject to any disclaimer, the term of this patent is extended or adjusted under 35 U.S.C. 154(b) by 120 days.

(21) Appl. No.: 14/874,876

(22) Filed: Oct. 5, 2015

Related U.S. Application Data

(60) Provisional application No. 62/063,282, filed on Oct. 13, 2014.

(51) Int. Cl.
| F16K 99/00 | (2006.01) |
| F16H 61/02 | (2006.01) |
| B23P 15/00 | (2006.01) |

(52) U.S. Cl.
CPC ........ *F16H 61/0276* (2013.01); *B23P 15/001* (2013.01); *F16K 99/0059* (2013.01); *F16H 2061/0279* (2013.01); *F16K 2099/0082* (2013.01)

(58) Field of Classification Search
CPC .......... F16K 99/0059; F16K 2099/082; F16K 2099/009; F16H 61/0276; F16H 2061/0279; B23P 15/001

USPC ............................................ 251/30.01–30.05
See application file for complete search history.

(56) References Cited

U.S. PATENT DOCUMENTS

| 3,589,387 A * | 6/1971 | Raymond ........... F15B 13/0817 137/261 |
| 5,183,019 A * | 2/1993 | Suhara .................... F02D 7/002 123/339.19 |
| 6,024,114 A * | 2/2000 | Thomas ................. B60T 17/004 137/244 |
| 6,505,811 B1 | 1/2003 | Barron et al. |
| 6,523,560 B1 | 2/2003 | Williams et al. |
| 6,540,203 B1 | 4/2003 | Hunnicutt |
| 6,540,204 B1 * | 4/2003 | Carter ................... F16K 31/406 137/489.5 |
| 6,694,998 B1 * | 2/2004 | Hunnicutt ............. B60T 8/3695 137/116.3 |
| 6,845,962 B1 | 1/2005 | Barron et al. |
| 6,971,232 B2 * | 12/2005 | Singh ....................... B60K 6/12 251/30.02 |
| 7,192,005 B2 | 3/2007 | Denyer et al. |
| 8,113,482 B2 | 2/2012 | Hunnicutt |
| 2005/0224734 A1 * | 10/2005 | Watson .................. F16K 31/041 251/30.01 |
| 2008/0023661 A1 * | 1/2008 | Gu ........................... F16K 7/17 251/30.01 |

(Continued)

*Primary Examiner* — Michael R Reid
*Assistant Examiner* — Jonathan Waddy
(74) *Attorney, Agent, or Firm* — MacMillan, Sobanski & Todd, LLC

(57) ABSTRACT

A two-stage control microvalve includes a generally cylindrical housing configured for insertion into a bore in a body of a hydro-mechanical valve system, a pilot microvalve mounted within the housing, and a piloted microvalve mounted within the housing and in fluid communication with the pilot microvalve.

11 Claims, 13 Drawing Sheets

(56) References Cited

U.S. PATENT DOCUMENTS

| | | | |
|---|---|---|---|
| 2009/0123300 A1* | 5/2009 | Uibel | F04B 27/1804 |
| | | | 417/213 |
| 2012/0145252 A1* | 6/2012 | Hunnicutt | F15B 13/0402 |
| | | | 137/14 |
| 2012/0241012 A1* | 9/2012 | Studer | F15B 13/0426 |
| | | | 137/1 |
| 2014/0373937 A1 | 12/2014 | Fuller et al. | |
| 2015/0352604 A1* | 12/2015 | Arunasalam | F16K 99/0044 |
| | | | 137/15.06 |

* cited by examiner

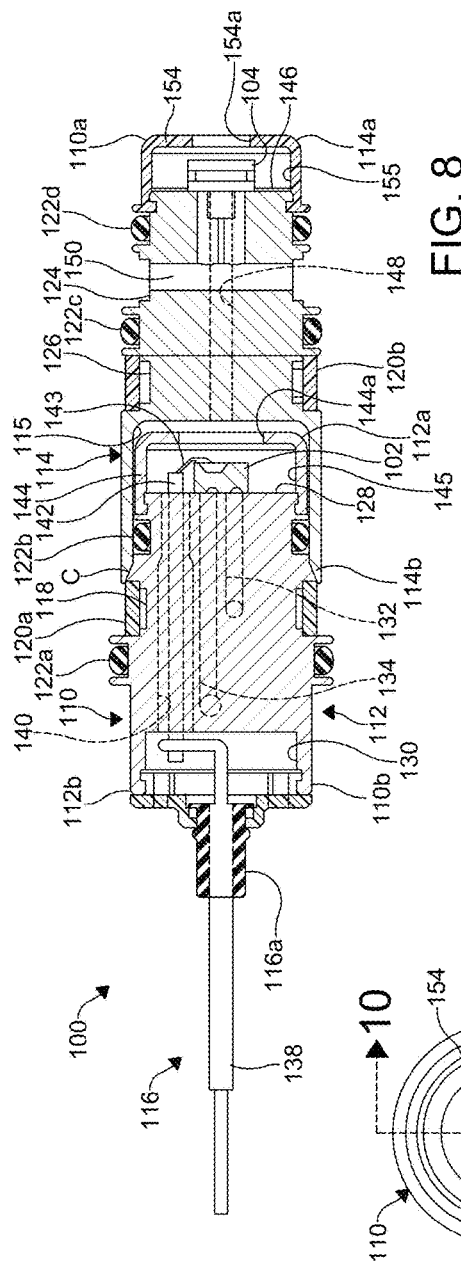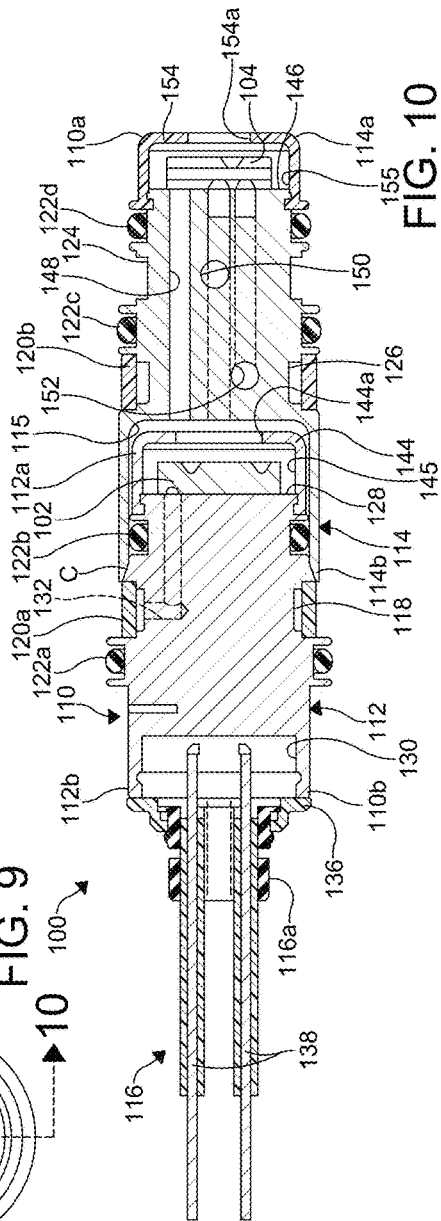

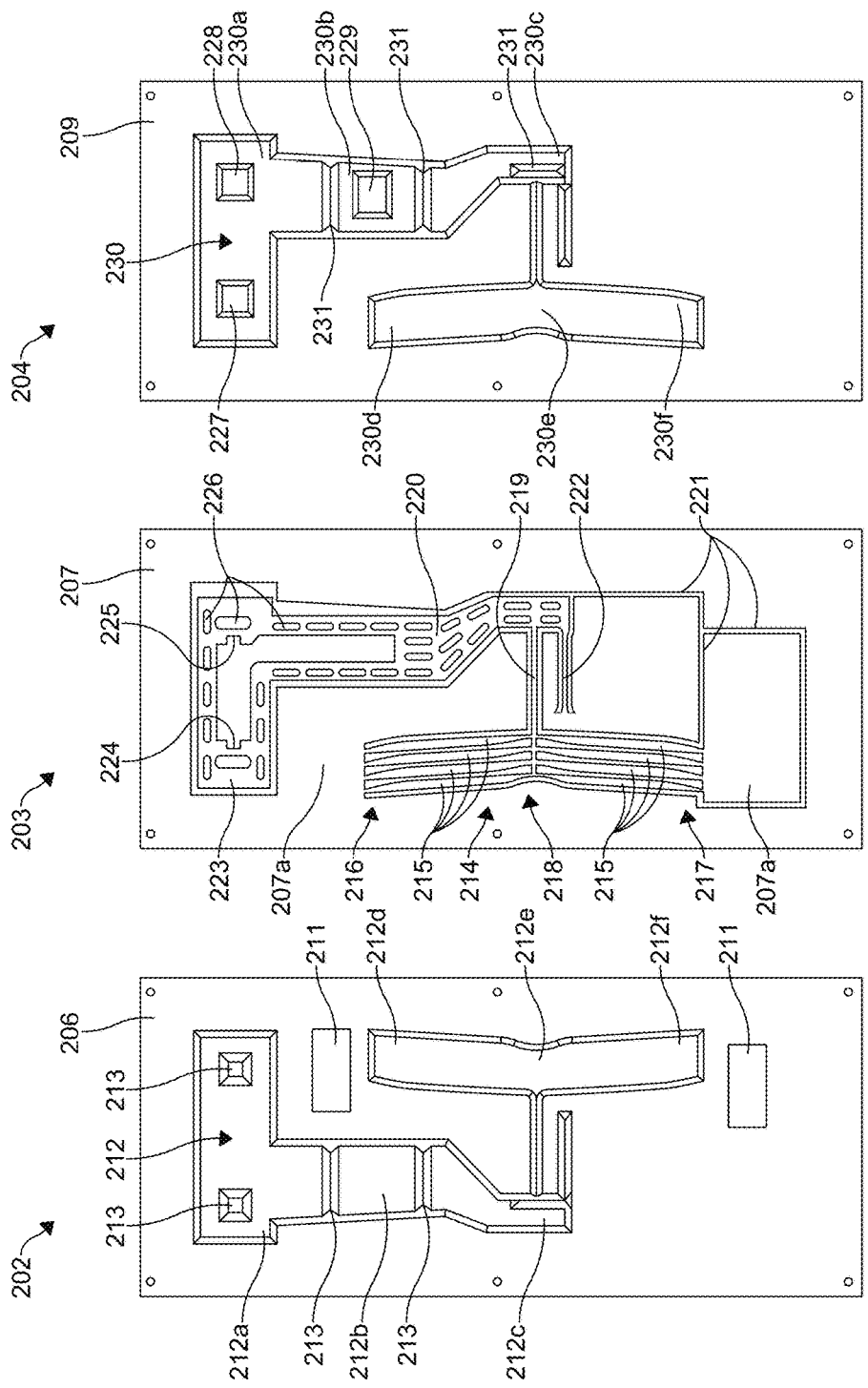

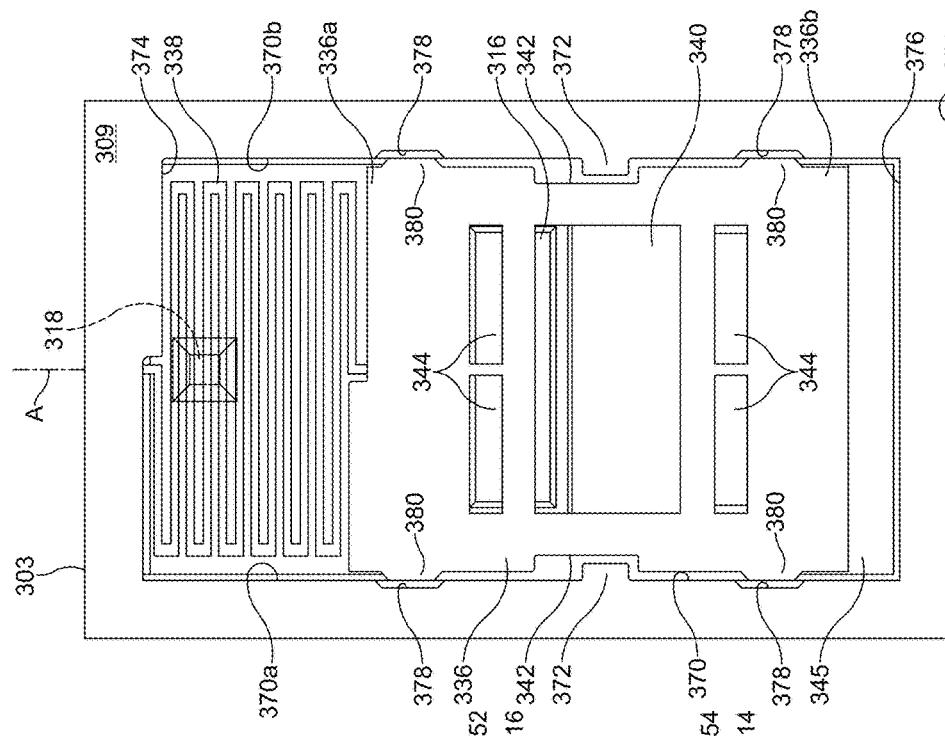
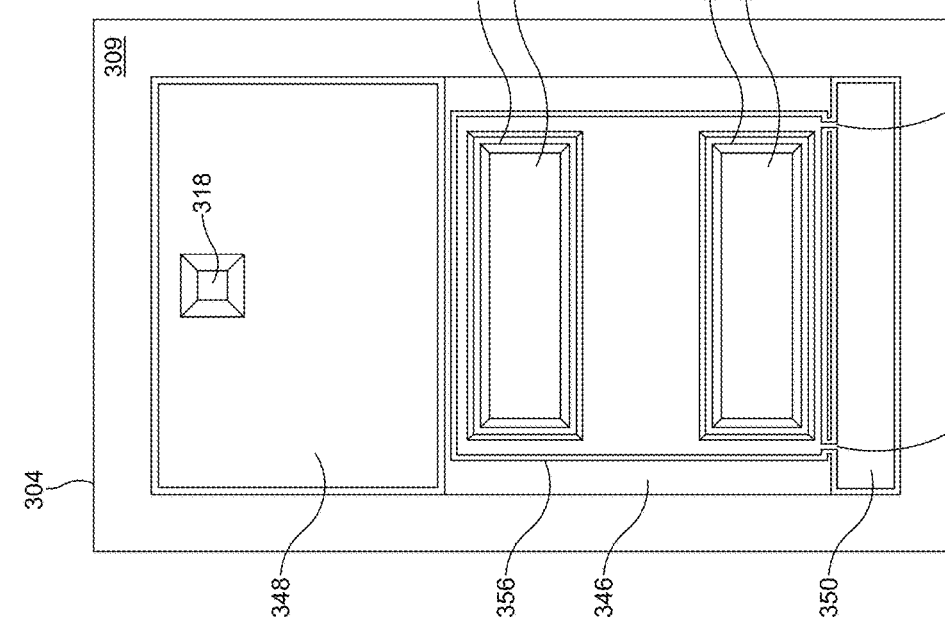
FIG. 19 (PRIOR ART)
FIG. 18 (PRIOR ART)

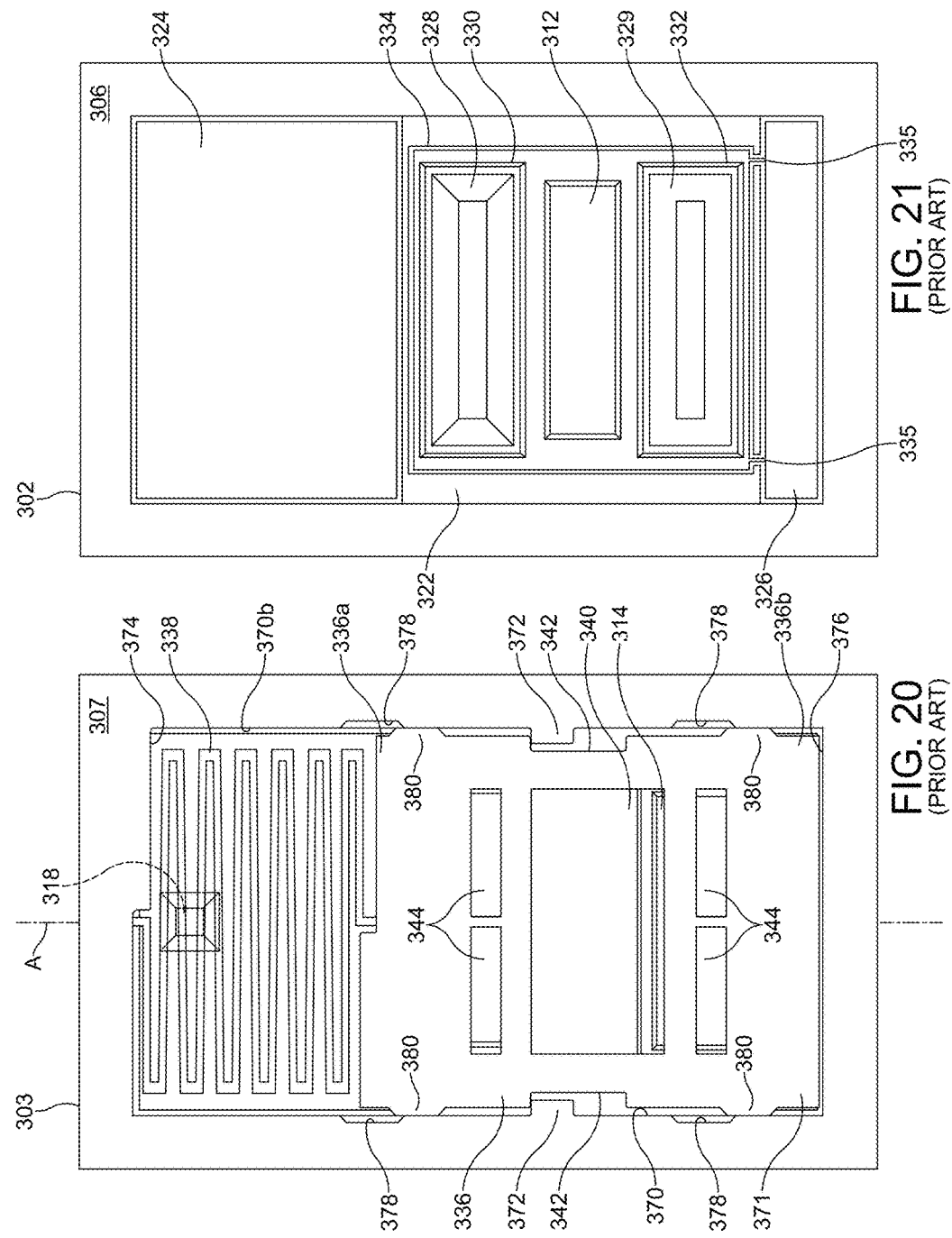

LINEAR PACKAGE FOR A TWO-STAGE CONTROL MICROVALVE

CROSS REFERENCE TO RELATED APPLICATIONS

This application claims the benefit of U.S. Provisional Application No. 62/063,282 filed Oct. 13, 2014, the disclosure of which is incorporated herein by reference.

BACKGROUND

This invention relates in general to two-stage control valves. In particular, this invention relates to an improved linear modular package for a two-stage control microvalve for use in a hydraulic fluid system such as an automatic transmission.

Internal combustion engines combust an air/fuel mixture within cylinders to drive pistons that rotatably turn a crankshaft generating drive torque. The drive torque may be transferred to a driveline of a vehicle, e.g., the wheels, via a transmission. The drive torque may also be translated or multiplied by one of a plurality of gear ratios of the transmission. The transmission may be coupled to the crankshaft via a torque converter. The transmission includes a plurality of components such as solenoid valves, clutches, and one or more planetary gear sets.

The solenoid valves may each include a solenoid and a valve. More specifically, the solenoid may convert electrical energy, e.g., current from a controller, into mechanical energy that opens or closes the valve mechanically. The transmission may also include servos that actuate one or more of the clutches. The clutches may engage one or more gears of the planetary gear sets.

The transmission also includes hydraulic fluid that controls one or more of the components. The hydraulic fluid is typically supplied to the transmission from a main pump. The transmission may include pressure control solenoid valves, shift solenoid valves, and/or flow control solenoid valves. The pressure control solenoid valves and the flow control solenoid valves control the pressure and flow of hydraulic fluid in the transmission, respectively. The shift solenoid valves, on the other hand, control components of the transmission, such as the servos, clutches, and gears, based on a pressure of the hydraulic fluid. Such valves can be relatively large and expensive to manufacture.

It would be desirable therefore, to provide an improved valve and actuator structure for a hydro-mechanical valve system, such as in a vehicle transmission.

SUMMARY

This invention relates to an improved linear modular package for a two-stage control microvalve for use in a hydraulic fluid system such as an automatic transmission. In one embodiment, a two-stage control microvalve includes a generally cylindrical housing configured for insertion into a bore in a body of a hydro-mechanical valve system, a pilot microvalve mounted within the housing, and a piloted microvalve mounted within the housing and in fluid communication with the pilot microvalve.

Various advantages of the invention will become apparent to those skilled in the art from the following detailed description, when read in view of the accompanying drawings.

BRIEF DESCRIPTION OF THE DRAWINGS

FIG. 8 is a cross-sectional view taken along the line 8-8 of FIG. 1.

FIG. 9 is an end view of the improved housing for a two-stage control microvalve illustrated in FIG. 1.

FIG. 10 is a cross-sectional view taken along the line 10-10 of FIG. 9.

FIG. 14 is a top plan view of an inner surface of the cover plate illustrated in FIGS. 12 and 13.

FIG. 15 is a top plan view of the intermediate plate illustrated in FIGS. 12 and 13.

FIG. 16 is a top plan view of an inner surface of the base plate illustrated in FIGS. 12 and 13.

FIG. 18 is a plan view of an inner surface of the base plate illustrated in FIG. 17.

FIG. 19 is a plan view of a first surface of the intermediate plate illustrated in FIG. 17 showing the intermediate plate in a first position.

FIG. 20 is an alternate plan view of the first surface of the intermediate plate illustrated in FIGS. 17 and 19 showing the intermediate plate in a second position.

FIG. 21 is a plan view of an inner surface of the cover plate illustrated in FIG. 17.

DETAILED DESCRIPTION

Figure 1:
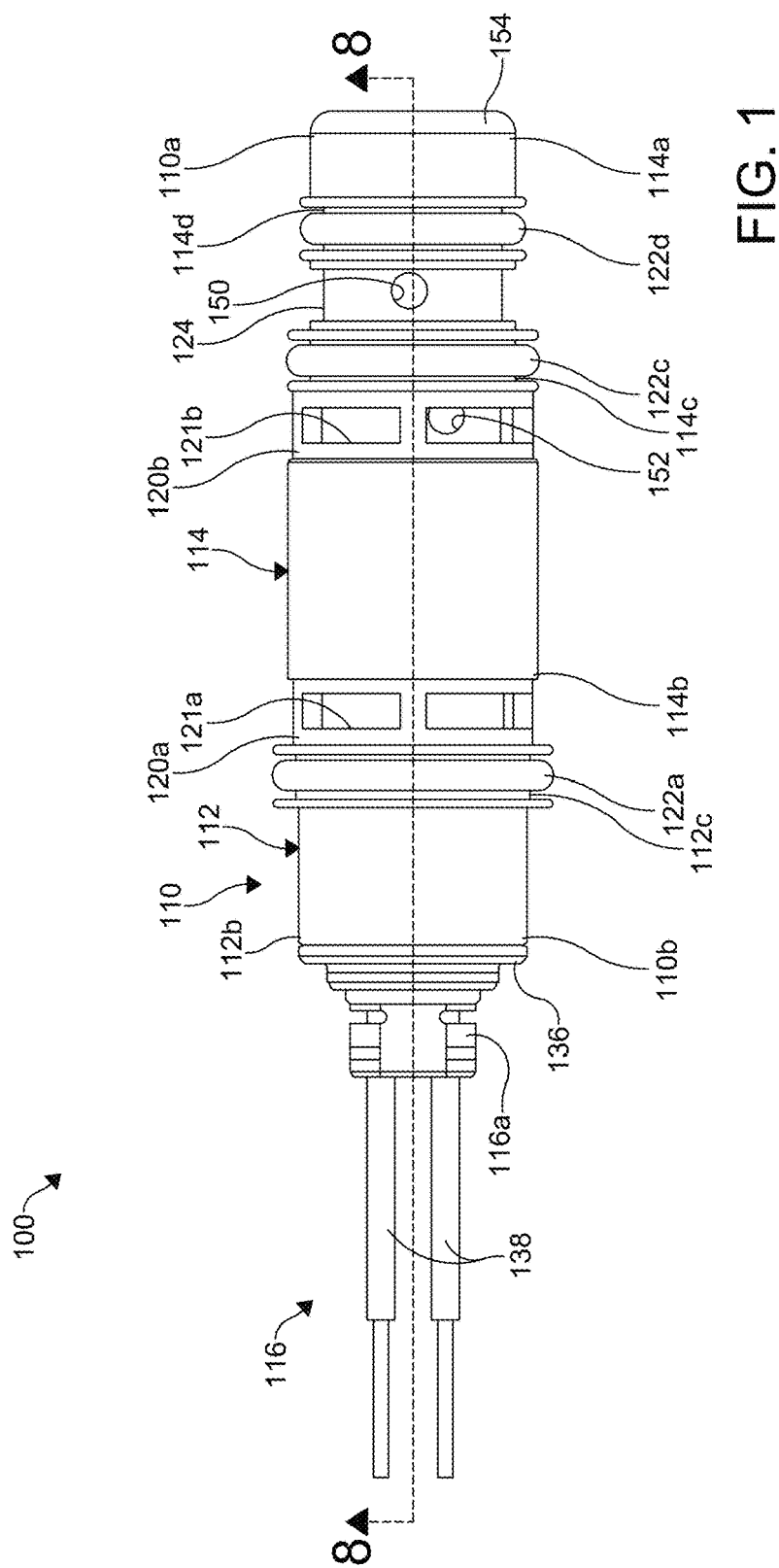
FIG. 1 is a side elevational view of an improved housing for a two-stage control microvalve according to this invention.

Referring now to FIG. 1, an improved two-stage control microvalve is shown generally at 100. The improved two-stage control microvalve 100 includes an improved housing 110 having a first end 110a and a second end 110b.

The housing 110 includes a first or pilot stage body 112 attached to a second stage body 114. The pilot stage body 112 has a first end 112a, best shown in FIG. 6, a second end 112b and has a substantially cylindrical shape. The second stage body 114 has a first end 114a and a second end 114b and has a substantially cylindrical shape. The first end 112a of the pilot stage body 112 is attached within the second end 114b of the second stage body 114, as best shown in FIGS. 8 and 10.

An electrical connector 116 extends outwardly from the second end 112b of the pilot stage body 112. As best shown in FIG. 8, a first circumferentially extending fluid channel 118 is formed in a central portion of the pilot stage body 112, and a circumferentially extending first filter 120a is mounted over the first circumferentially extending fluid channel 118. The first filter 120a includes a plurality of fluid flow openings 121a, each of which may have a filter screen (not shown) attached therein. The illustrated first filter 120a is preferably formed from glass filled nylon. Alternatively, the first filter 120a may be formed from any desired polymer or other material.

Figure 6:
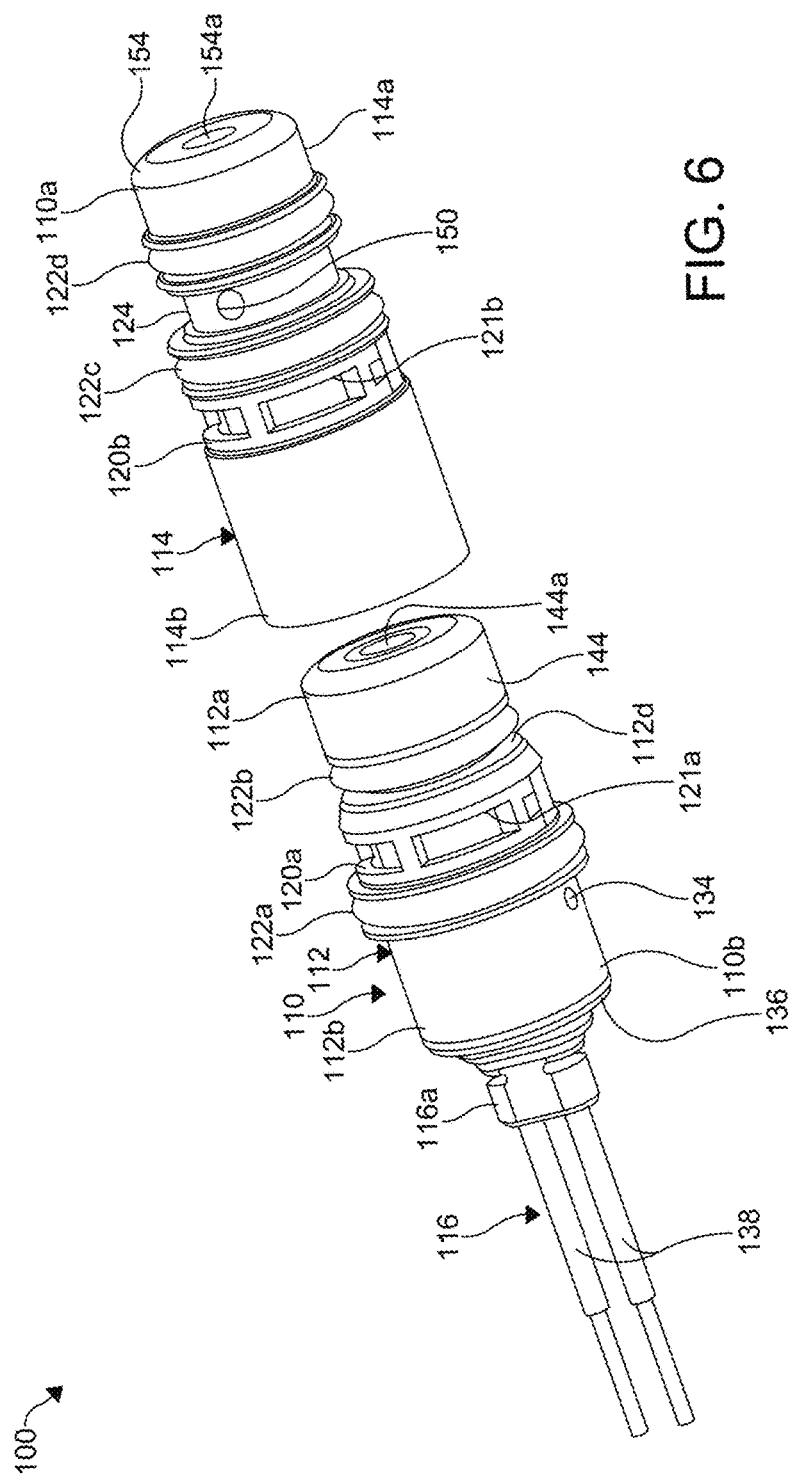
FIG. 6 is a perspective view of the improved housing for a two-stage control microvalve illustrated in FIG. 1 showing the pilot stage body separated from the second stage body.
Figure 7:
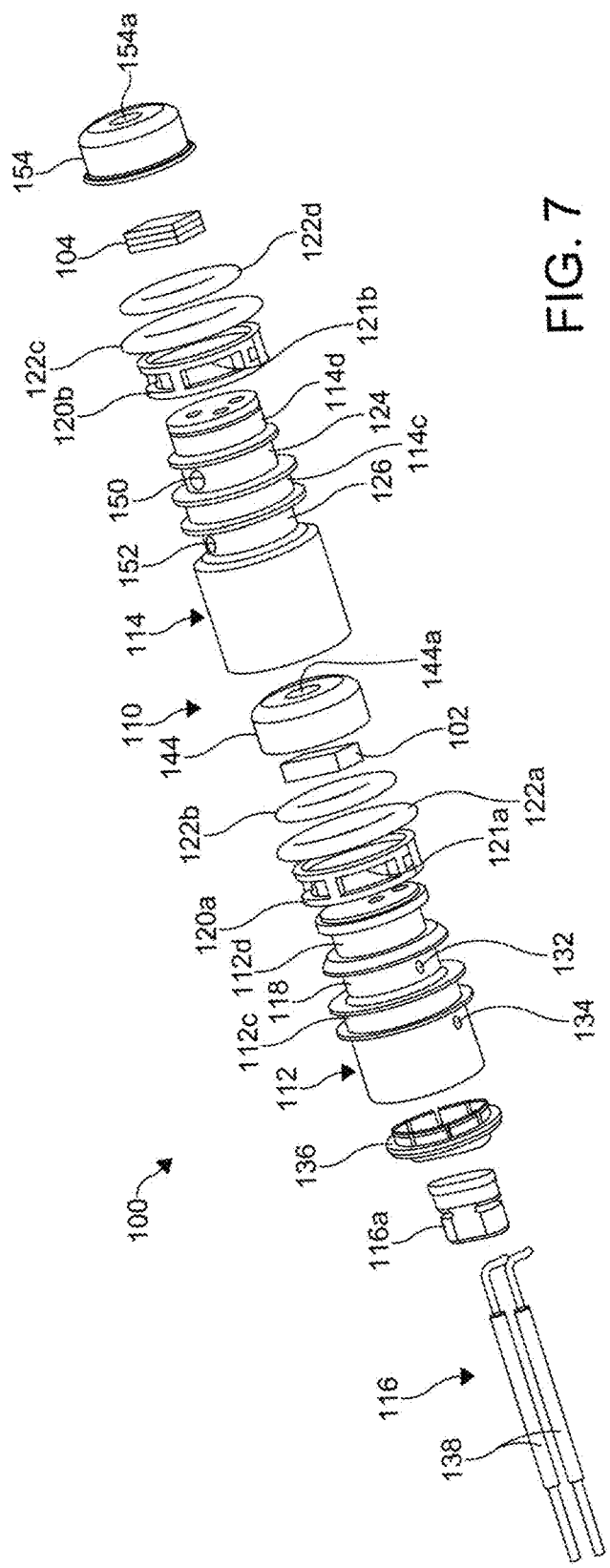
FIG. 7 is an exploded perspective view of the improved housing for a two-stage control microvalve illustrated in FIG. 1.

A first O-ring 122a is mounted in a first circumferential groove 112c formed in an outside surface of the pilot stage body 112. As best shown in FIG. 6, a second O-ring 122b is mounted in a second circumferential groove 112d formed in a portion of the outside surface of the pilot stage body 112 that is inserted within the second end 114b of the second stage body 114.

A third O-ring 122c is mounted in a third circumferential groove 114c formed in an outside surface of the second stage body 114. A fourth O-ring 122d is mounted in a fourth circumferential groove 114d formed in a central portion of the second stage body 114. A second circumferentially extending fluid channel 124 is formed in a central portion of the second stage body 114 between the third and fourth O-rings 122c and 122d. As best shown in FIG. 8, a third circumferentially extending fluid channel 126 is formed in a central portion of the second stage body 114, and a circumferentially extending second filter 120b is mounted over the third circumferentially extending fluid channel 126. The second filter 120b includes a plurality of fluid flow openings 121b, each of which may have a filter screen (not shown) attached therein. The complete structure of the improved housing 110, and the two-stage control microvalve 100 housed therein, will be described in detail below. The illustrated second filter 120b is preferably formed from glass filled nylon. Alternatively, the second filter 120b may be formed from any desired polymer or other material.

Fluid pressure in a hydro-mechanical valve system, such as in a vehicle transmission, is commonly regulated using a spool valve actuated by a solenoid. Such a spool valve-solenoid actuator arrangement is described in U.S. Pat. No. 7,192,005, and illustrated herein in FIG. 2.

Figure 2:
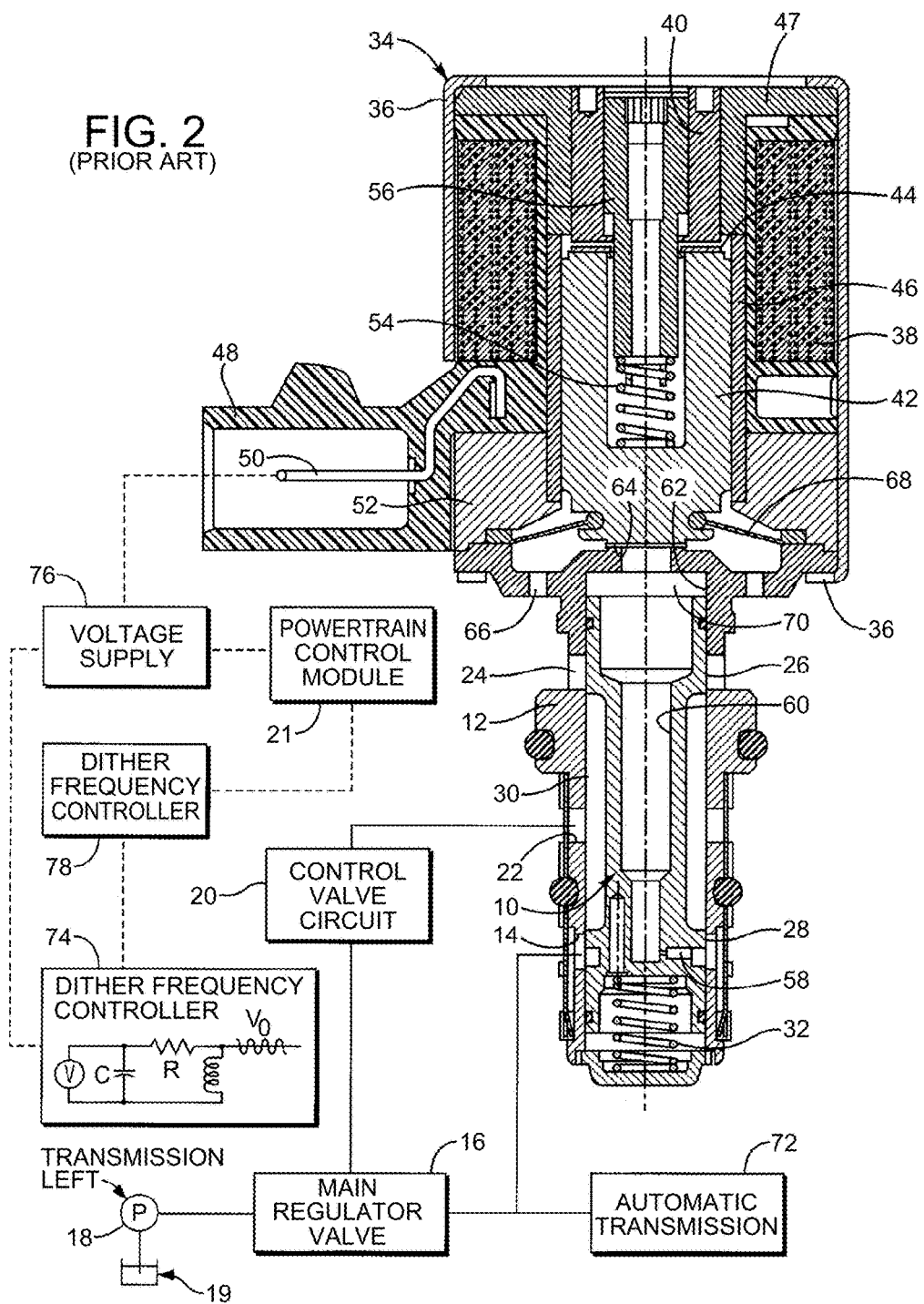
FIG. 2 is a schematic view of a known automatic transmission control circuit showing a cross-sectional view of a conventional solenoid operated valve.

The illustrated solenoid operated valve illustrated in FIG. 2 is shown in an automatic transmission control circuit and is an example of a conventional pressure regulation system in a hydro-mechanical valve system that uses an electronically-controlled valve actuating solenoid. In the illustrated solenoid operated valve, control pressure developed by the transmission valve system actuates fluid pressure operated clutch and band servos in a gear system.

The conventional solenoid operated valve illustrated in FIG. 2 includes a valve spool 10 positioned in a valve body 12. A fluid pressure inlet port 14 in the valve body 12 communicates with a main pressure regulator valve 16 of an automatic transmission control system. The main regulator valve 16 is supplied with fluid pressure from a transmission tank or sump 19 by a transmission pump 18 driven by an engine in a vehicle driveline. The regulator valve 16 communicates with a transmission control valve circuit 20 and with a valve pressure port 22 and the fluid pressure inlet port 14 in valve body 12.

An automatic transmission 72 includes transmission ratio shift valves that respond to regulated line pressure in a conventional manner.

An exhaust port 24 cooperates with a first valve land 26 on the valve spool 10. A second valve land 28 cooperates with the inlet port 14. An annular space 30 is defined around the valve spool 10 and is in fluid communication with the control pressure port 22. The first and second valve lands 26 and 28 control the volume of fluid flow between the control pressure port 22 and each of the ports 14 and 24, respectively. A spring 32 urges the valve spool 10 in an upward direction, as viewed in FIG. 2.

A solenoid actuator 34 is attached to a first end of the valve body 12 (the upper end when viewing FIG. 2). The solenoid actuator 34 includes a solenoid housing 36, which is secured to the upper end of the valve body 12. A solenoid coil 38 is housed in the solenoid housing 36 and surrounds a pole piece 40 and a movable armature 42. The armature 42 is aligned with the pole piece 40 and is separated from it by a calibrated air gap 44. An armature guide 46 surrounds the armature 42 and guides movement of the armature 42 as the armature 42 is displaced by an electromagnetic field created by the coil 38.

An electrical connector 48 includes electrical leads 50 for the coil 38. A connector housing is secured, as shown, between a flux washer 52 and the coil 38 within the housing 36. A flux flow path passes through coil 38, an upper flux washer 47, the housing 36, the flux washer 52, the armature 42, the air gap 44, and then to the pole piece 40.

An armature spring 54 urges the armature 42 in a downward direction, as viewed in FIG. 2. The spring 54 is seated on an adjustment screw 56 received within the pole piece 40 and threadably mounted thereto. Movement of the adjustment screw 56 may then adjust the force of spring 54.

The valve spool 10 further has a restricted flow passage 58 that communicates with a central pressure flow passage 60 in the valve spool 10. The passage 60 conducts fluid from the inlet port 14 to a pilot valve orifice 62 in the valve body 12. A pilot valve element 64 at a lower end of the armature 42 registers with the orifice 62 and establishes restricted and controlled fluid communication between the central pressure flow passage 60 and one or more exhaust ports 66. A space or chamber defined between the exhaust ports 66 and the armature 42 is sealed by a flexible diaphragm seal 68.

When the solenoid coil 38 is energized, the armature 42 registers with the orifice 62, thereby controlling fluid pressure build-up in a pressure cavity 70. The fluid pressure in the pressure cavity 70 creates a hydraulic pressure force on the valve spool 10, which opposes the force of spring 32 and a control pressure force acting on a lower end (when viewing FIG. 2) of the valve spool 10. Thus, a fluid pressure at the control pressure port 22 is a function of the electromagnetic force of the armature 42 when an energizing current is applied to the coil 38.

As further shown in FIG. 2, the control valve circuit 20 receives regulated control pressure from the solenoid operated valve pressure port 22 and controls the main regulator line pressure for clutch and band actuators of the automatic transmission, shown schematically at 72.

A dither frequency oscillator 74 imposes a dither frequency on a voltage supply 76 in a known manner. A dither frequency controller 78 is in electrical communication with a powertrain control module 21 and the dither frequency oscillator 74. The powertrain control module 21 may include pre-calibrated pressure and frequency data in a computer memory, and is effective to modify the dither current supplied to the solenoid actuator 34 as needed.

Fluid pressure in a hydro-mechanical valve system, such as in a vehicle transmission, may also be regulated using a two-stage microvalve mounted to a manifold. Such a known manifold is shown at 80 in FIGS. 3 through 5. The manifold 80 illustrated in FIGS. 3 through 5 may be mounted within a sump, such as the sump 19 shown in FIG. 2.

The manifold 80 includes a base 82, a base plate 84, and a cover 86 formed of a suitable material, such as steel. The base 82 includes a plurality of fluid flow cavities 83, best shown in FIG. 4, formed therein. Fluid flow ports, including a normally closed port 85a, a normally open port 85b, and a control port 85c, extend from an outside surface 82d of the base 82 into the fluid flow cavities 83. Additionally, a plurality of first or base fastener apertures 82a are formed in the base 82 for receiving fasteners (not shown) for attaching the manifold 80 within the sump 19. A plurality of second fastener apertures 82b are formed in the base 82 for receiving fasteners (not shown) for attaching the base plate 84 and the cover 86 to the base 82. A plurality of third fastener apertures 82c are also formed in the base 82 for receiving fasteners (not shown) for attaching a circuit board 94 and the base plate 84 to the base 82.

Figure 3:
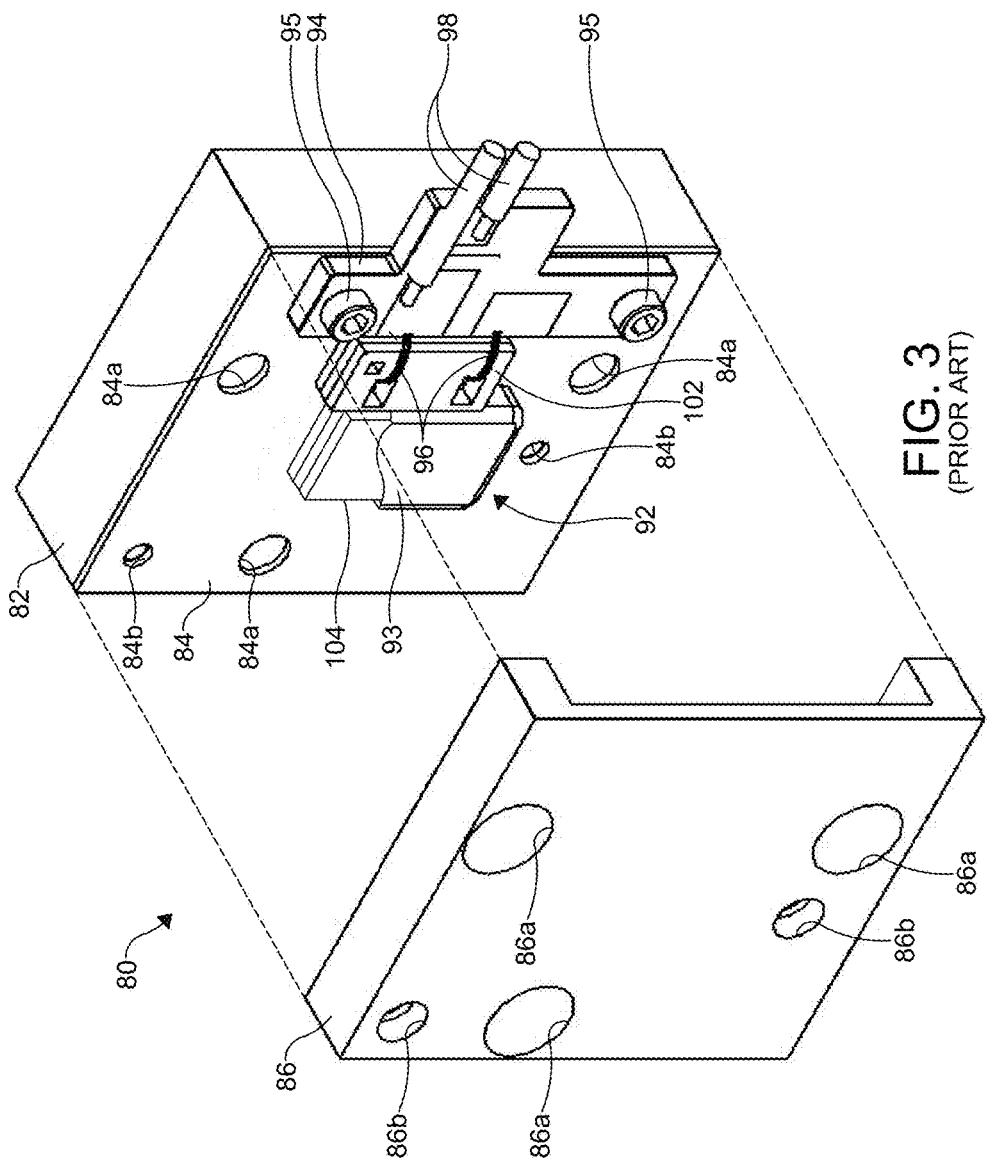
FIG. 3 is a partially exploded perspective view of a known two-stage microvalve mounted to a manifold.

The base plate 84 is substantially flat and includes first, second, and third fastener apertures 84a, 84b, and 84c aligned with the base fastener apertures 82a, the second fastener apertures 82b, and the third fastener apertures 82c, respectively. The base plate 84 also includes first fluid flow apertures 88 and second fluid flow apertures 90. A pilot microvalve, such as a pilot microvalve 102 described in detail below, and a piloted microvalve, such as the piloted microvalve 104 also described in detail below, are mounted to the base plate 84 and define a two-stage microvalve 92. As shown in FIG. 3, the pilot microvalve 102 is mounted to the base plate 84 such that it is in fluid communication with the first fluid flow apertures 88. Similarly, the piloted microvalve 104 is mounted to the base plate 84 such that it is in fluid communication with the second fluid flow apertures 90. A piloted microvalve cover 93, a portion of which is shown in FIG. 3, covers the piloted microvalve 104 and is attached to the base plate 84, such as by soldering.

The cover 86 includes a plurality of first cover fastener apertures 86a formed therethrough for receiving fasteners (not shown) and aligned with the base fastener apertures 82a. The cover 86 also includes a plurality of second cover fastener apertures 86b formed therethrough for receiving fasteners (not shown) for attaching the cover 86 to the base 82 via the second fastener apertures 82b.

A circuit board 94 is mounted to the base plate 84 by fasteners 95 and is electrically connected to the pilot microvalve 102. Electrical connectors 96, such as electrical wires, extend between wire bond pads on the circuit board 94 and the pilot microvalve 102. Additional electrical wires 98 extend between the circuit board 94 and a source of electrical power (not shown).

Figure 4:
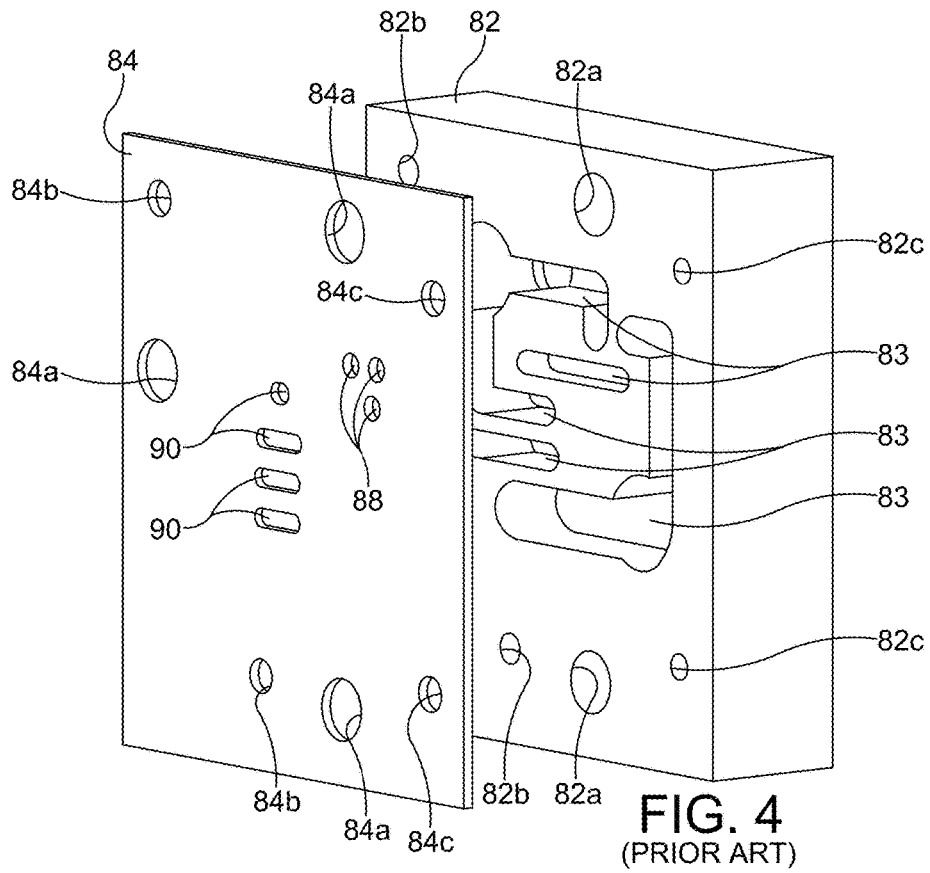
FIG. 4 is an exploded perspective view of the base and the base plate of the manifold illustrated in FIG. 3.
Figure 5:
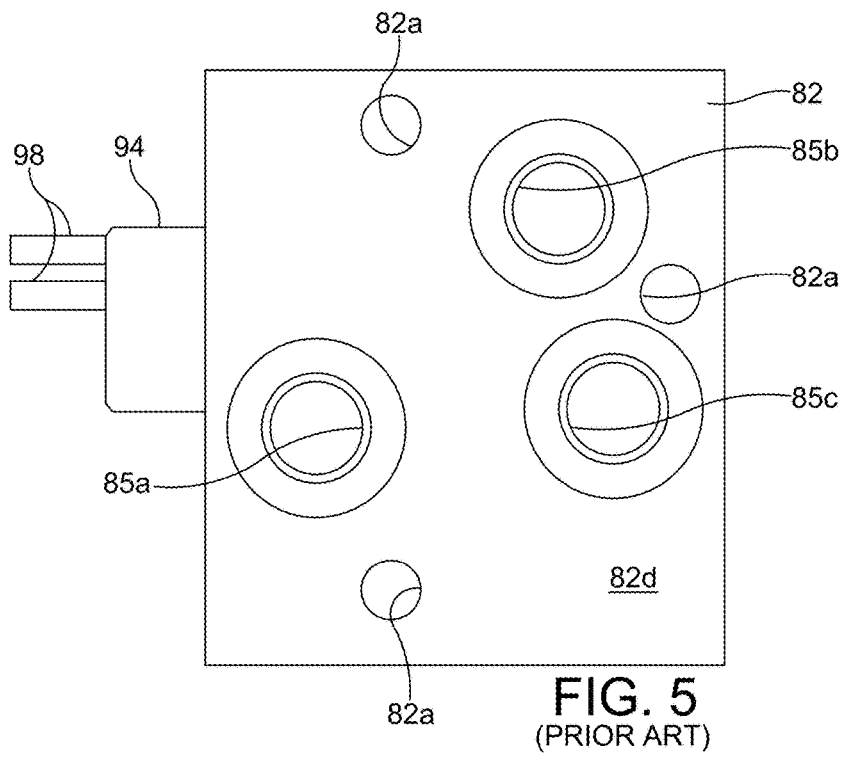
FIG. 5 is a plan view of the outside surface of the base of the assembled manifold illustrated in FIG. 3.

It will be understood that the embodiment illustrated in FIGS. 3 through 5 represents one embodiment of a conventional packaging arrangement of the two-stage microvalve 92 mounted to the manifold 80 in the sump 19. The illustrated manifold 80 is very complex and requires a number of relatively difficult and time consuming manufacturing steps; e.g., the base 82 requires a complex machining operation to form the fluid flow cavities 83. Once machined, the base plate 84 must be attached, such as by brazing, to the base 82, and the base 82, base plate 84, and cover 86 must be plated, such as with nickel or gold.

The manifold 80 is also difficult to assemble, and requires a plurality of fasteners (not shown) to mount the base 82 within the sump 19, a plurality of the fasteners 95 to mount the circuit board 94 to the base 82, and a plurality of fasteners (not shown) to mount the cover 86 to the base 82. The piloted microvalve cover 93 must also be attached to the base plate 84, such as by soldering.

Referring again to FIG. 1 and to FIGS. 6 through 10, the improved two-stage control microvalve 100 is shown in detail. The two-stage control microvalve 100 includes a pilot microvalve 102 and a piloted microvalve 104 in the improved housing 110. In the embodiment illustrated, the improved housing 110 is a relatively simple structure that may be easily adapted to existing manufacturing practices and methods.

As best shown in FIGS. 8 and 10, the first end 112a of the pilot stage body 112 defines a manifold 128, and the second end 112b has a substantially cylindrical cavity 130 formed therein. The pilot microvalve 102 is mounted to the manifold 128 by any suitable method, such as with solder.

A first fluid passageway 132 extends radially from the first circumferentially extending fluid channel 118 formed in the pilot stage body 112 and continues longitudinally to a first fluid port of the pilot microvalve 102. A second fluid passageway 134 extends radially from an outside surface of the pilot stage body 112 and continues longitudinally to a second fluid port of the pilot microvalve 102. The illustrated pilot stage body 112 is preferably formed from steel. Alternatively, the pilot stage body 112 may be formed from any desired metal, composite or other material.

A mounting ring 136 for the electrical connector 116, such as a conventional pig-tail connector, is mounted within the cavity 130 in the second end 112b of the pilot stage body 112. The electrical connector 116 includes a strain relief member 116a and electrical wires 138 extending therefrom. The electrical wires 138 extend between the pilot stage body 112 and a source of electrical power (not shown). The illustrated mounting ring 136 is preferably formed from glass filled nylon. Alternatively, the mounting ring 136 may be formed from any desired material. The illustrated strain relief member 116a is preferably formed from flexible thermoplastic elastomer (TPE), such as Santoprene®. Alternatively, the relief member 116a may be formed from any desired flexible TPE or other material.

One or more longitudinally extending electrical passageways 140 are formed through the pilot stage body 112 between the cavity 130 and the manifold 128. The electrical passageways 140 are configured to receive electrical wires 142. Electrical wires 143 extend between wire bond pads on the pilot microvalve 102 and the electrical wires 142. The electrical wires 138 are further connected to the electrical wires 142.

A first generally cup-shaped cap 144 is attached to an outside surface of the pilot stage body 112 at the first end 112a thereof. The cap 144 has a substantially cylindrical outer surface and includes an opening 144a defining a flow path for fluid between the pilot microvalve 102 and the piloted microvalve 104 via the second stage body 114. An interior of the cap 144 defines a cavity 145 within which the pilot microvalve 102 is mounted. A filter screen (not shown) may be attached within the opening 144a. The illustrated cap 144 is preferably formed from glass filled nylon. Alternatively, the cap 144 may be formed from any desired polymer or other material.

Referring again to FIGS. 6 through 8 and to FIG. 10, the first end 112a of the pilot stage body 112 is attached within a substantially cylindrical cavity 115 formed in the second end 114b of the second stage body 114.

The piloted microvalve 104 is mounted to a manifold 146 formed at the first end 114a of the second stage body 114. A third fluid passageway 148 is formed longitudinally through the second stage body 114 and provides fluid communication between the pilot microvalve 102 and a control port of the piloted microvalve 104.

A fourth fluid passageway 150 extends radially from the second circumferentially extending fluid channel 124 formed in the second stage body 114 and continues longitudinally to a first fluid port of the piloted microvalve 104. A fifth fluid passageway 152 extends radially from the third circumferentially extending fluid channel 126 formed in the second stage body 114 and continues longitudinally to a second fluid port of the piloted microvalve 104.

A second generally cup-shaped cap 154 is mounted to an outside surface of the second stage body 114 at the first end 114a thereof. The cap 154 has a substantially cylindrical outer surface and includes an opening 154a defining a flow path for fluid between the piloted microvalve 104 and a load, such as a clutch load or a brake load of a hydraulic fluid system to which the improved two-stage control microvalve 100 is attached. An interior of the cap 154 defines a cavity 155 within which the piloted microvalve 104 is mounted. A filter screen (not shown) may be attached within the opening 154a. The illustrated cap 154 is preferably formed from glass filled nylon. Alternatively, the cap 154 may be formed from any desired polymer or other material.

As described above, the first end 112a of the pilot stage body 112 is attached within the cavity 115 formed in the second end 114b of the second stage body 114. The pilot stage body 112 may be attached to the second stage body 114 by any desired means, such as by crimping as shown at C in FIGS. 8 and 10.

Figure 11:
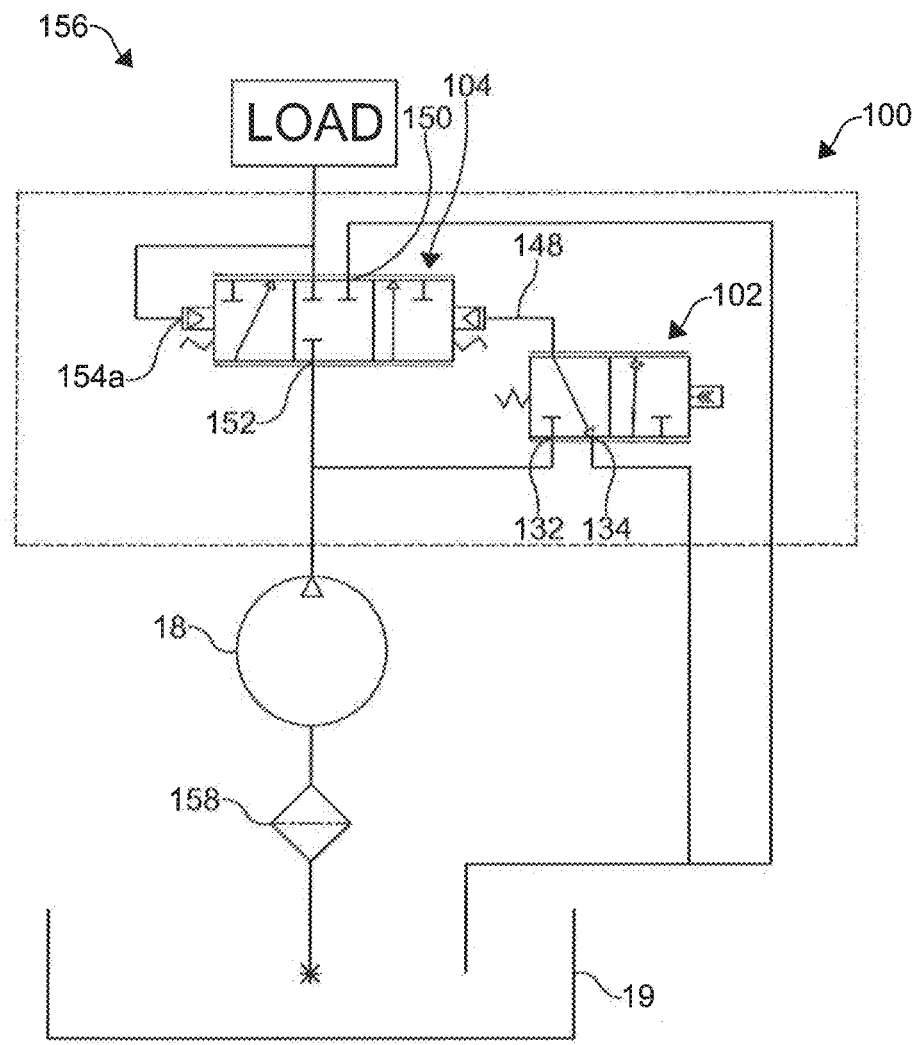
FIG. 11 is a schematic illustration of an exemplary transmission including the improved two-stage control microvalve illustrated in FIG. 1 and FIGS. 6 through 10.

Referring now to FIG. 11, a schematic illustration of an exemplary hydraulic fluid system is shown at 156. The exemplary hydraulic fluid system 156 may be any desired hydraulic fluid system, such as an automatic transmission. The hydraulic fluid system 156 includes the improved two-stage control microvalve 100 illustrated in detail in FIG. 1 and FIGS. 6 through 10. As shown, pressurized fluid is moved from a fluid source, such as a sump 19, by a pump 18. In the illustrated hydraulic fluid system 156, a fluid filter 158 is provided between the sump 19 and the pump 18. Pressurized fluid enters the pilot microvalve 102 through the first fluid passageway 132 and enters the piloted microvalve 104 through the fifth fluid passageway 152. The third fluid passageway 148 provides fluid communication between the pilot microvalve 102 and a control port of the piloted microvalve 104. Fluid may return to the sump 19 through the second fluid passageway 134 of the pilot microvalve 102 and the fourth fluid passageway 150 of the piloted microvalve 104. As described above, the improved two-stage control microvalve 100 provides pressurized fluid via an opening 154a to a load, such as a clutch in an automatic transmission or a brake.

The assembled housing 110 of the improved two-stage control microvalve 100 may have any desired maximum outside diameter, such as within the range of from about 14 mm to about 16 mm, and may have any desired length, such as within the range of from about 38 mm to about 40 mm.

The improved housing 110 may be inserted into a bore in a main valve body (not shown) of a transmission, or other hydro-mechanical valve system, and may be retained therein with a spring clip (not shown) or a similar retention device.

The pilot stage body 112 and the second stage body 114 may be separately manufactured and assembled prior to being attached together to define the housing 110. Thus, because the pilot microvalve 102 is mounted to the manifold 128 of the pilot stage body 112, and the piloted microvalve 104 is mounted to the manifold 146 of the second stage body 114 before the pilot stage body 112 and the second stage body 114 are assembled together, the pilot stage body 112 and its attached pilot microvalve 102, and the second stage body 114 and its attached piloted microvalve 104, may each be easily and separately tested prior to final assembly of the improved two-stage control microvalve 100.

Because the improved two-stage control microvalve 100 is mounted in a bore in a main valve body of a transmission or other hydro-mechanical valve system, the microvalves 102 and 104 are located within the operating fluid of the transmission, thereby reducing the pressure differential between the microvalves 102 and 104 and the fluid system within which the microvalves 102 and 104 operate.

The pilot microvalve 102 illustrated and described above is a MEMS based microvalve illustrated in detail herein in FIGS. 12 through 16 and described in detail below. The pilot microvalve 102 is an electro-thermally driven device that is proportionally controlled by varying applied power to an actuator in the microvalve 102. The illustrated pilot microvalve 102 is configured as a 3-port proportional pressure control valve, but may also be configured as a 2-port proportional flow control valve.

The illustrated piloted microvalve 104 is a MEMS based microvalve having a flow-through design, illustrated in detail herein in FIGS. 17 through 25 and described in detail below.

Micro Electro Mechanical Systems (MEMS) are a class of systems that are physically small, having features with sizes in the micrometer range; i.e., about 10 μm or smaller. These systems have both electrical and mechanical components. The term "micromachining" is commonly understood to mean the production of three-dimensional structures and moving parts of MEMS devices. MEMS originally used modified integrated circuit (computer chip) fabrication techniques (such as chemical etching) and materials (such as silicon semiconductor material) to micromachine these very small mechanical devices. Today, there are many more micromachining techniques and materials available. The term "micromachined device" as used in this application means a device having some features with sizes of about 10 μm or smaller, and thus by definition is at least partially formed by micromachining. More particularly, the term "microvalve" as used in this application means a valve having features with sizes of about 10 μm or smaller, and thus by definition is at least partially formed by micromachining. The term "microvalve device" as used in this application means a micromachined device that includes a microvalve, and that may include other components. It should be noted that if components other than a microvalve are included in the microvalve device, these other components may be micromachined components or standard sized (larger) components. Similarly, a micromachined device may include both micromachined components and standard sized (larger) components.

Various microvalve devices have been proposed for controlling fluid flow within a fluid circuit. A typical microvalve device includes a displaceable member or valve component movably supported by a body for movement between a closed position and a fully open position. When placed in the closed position, the valve component substantially blocks or closes a first fluid port that is otherwise in fluid communication with a second fluid port, thereby substantially preventing fluid from flowing between the fluid ports. When the valve component moves from the closed position to the fully open position, fluid is increasingly allowed to flow between the fluid ports.

U.S. Pat. Nos. 6,523,560, 6,540,203, and 6,845,962, the disclosures of which are incorporated herein by reference, describe microvalves made of multiple layers of material. The multiple layers are micromachined and bonded together to form a microvalve body and the various microvalve components contained therein, including an intermediate mechanical layer containing the movable parts of the microvalve. The movable parts are formed by removing material from an intermediate mechanical layer (by known micromachined device fabrication techniques, such as, but not limited to, Deep Reactive Ion Etching) to create a movable valve element that remains attached to the rest of the part by a spring-like member. Typically, the material is removed by creating a pattern of slots through the material to achieve the desired shape. The movable valve element will then be able to move in one or more directions an amount roughly equal to the slot width.

One embodiment of a microvalve device suitable for use as the pilot microvalve 102 is described in U.S. Published Patent Application No. 2014/0373937 to Fuller et al., the disclosure of which is incorporated in its entirety herein. For the sake of brevity, only those portions of U.S. Published Patent Application No. 2014/0373937 that are particularly relevant to the present invention will be discussed herein.

Figure 12:
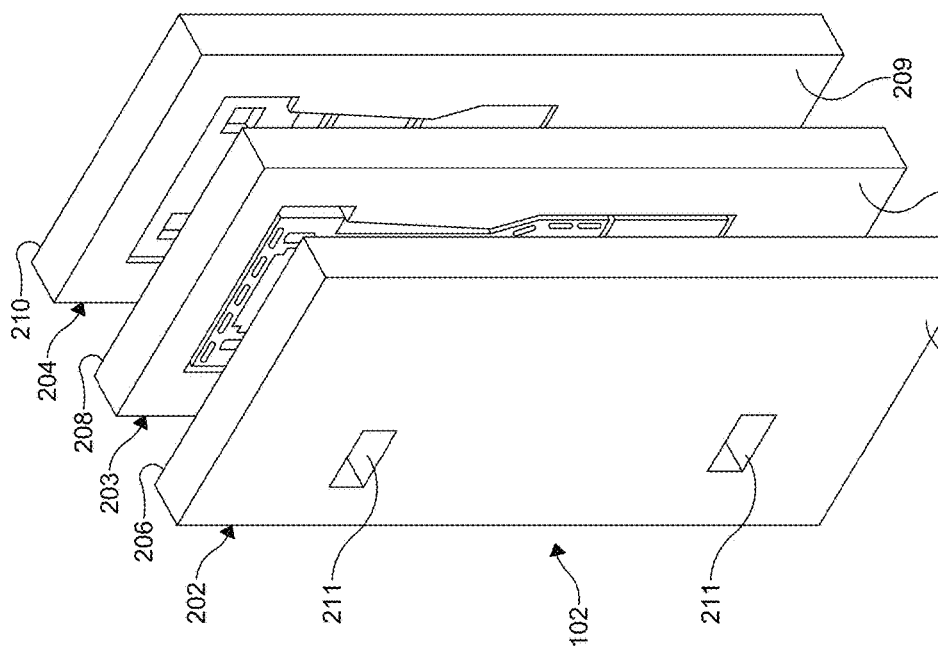
FIG. 12 is an exploded perspective view of a known pilot microvalve device having a cover plate, an intermediate plate, and a base plate.

FIG. 12 is an exploded perspective view of the pilot microvalve 102. The pilot microvalve 102 has a cover plate 202, an intermediate plate 203, and a base plate 204. The cover plate 202 has an outer surface 205 and an inner surface 206. The intermediate plate 203 has a first surface 207 and a second surface 208. The base plate 204 has an inner surface 209 and an outer surface 210. The cover plate 202, the intermediate plate 203, and the base plate 204 combine to define a body configured to support a valve element, described below.

Figure 13:
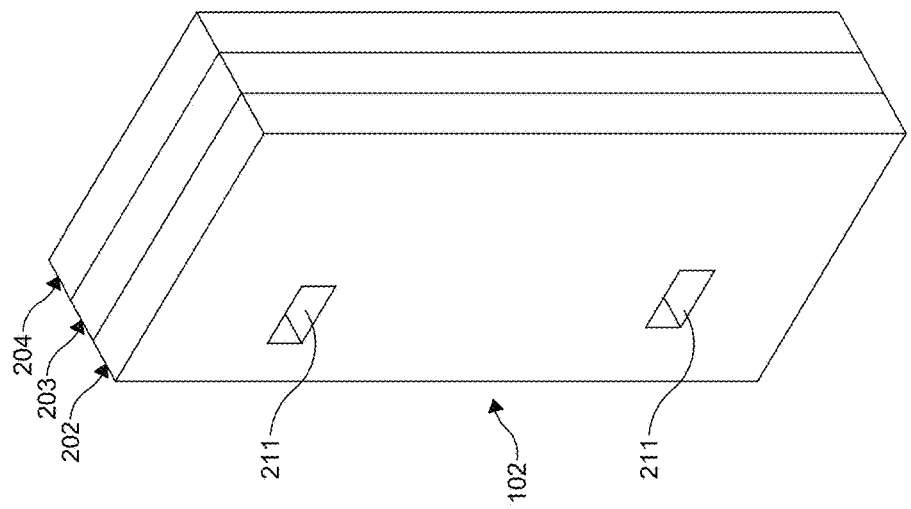
FIG. 13 is a perspective view of the known microvalve device illustrated in FIG. 12 shown assembled.

FIG. 13 is a perspective view of the pilot microvalve 102 illustrated in FIG. 12 shown assembled. Upon assembly of the pilot microvalve 102, the inner surface 206 of the cover plate 202 engages the first surface 207 of the intermediate plate 203, while the inner surface 209 of the base plate 204 engages the second surface 208 of the intermediate plate 203.

The cover plate 202, the intermediate plate 203, and/or the base plate 204 of the pilot microvalve 102 may be chemically and/or physically bonded together by any suitable method known to those of ordinary skill in the art, non-limiting examples of which include one or more types of mechanical fasteners and/or adhesives.

The inner surface 206 of the cover plate 202 is shown in FIG. 14. In the illustrated embodiment, the cover plate 202 includes electrical ports 211, the purpose of which is described below.

As shown in FIG. 14, the inner surface 206 of the cover plate 202 includes an actuator cavity 212 having one or more pressure equalization recesses or depressions 213 that reduce or prevent pressure imbalances during operation of the pilot microvalve 102.

The actuator cavity 212 in the inner surface 206 of the cover plate 202 is located adjacent to, and has a shape corresponding to, an actuator 214 on the intermediate plate 203.

The illustrated actuator cavity 212 includes an upper actuator arm cavity region 212a, a central actuator arm cavity region 212b, a lower actuator arm cavity region 212c, a dead end rib cavity region 212d, a central rib cavity region 212e, and an open end rib cavity region 212f.

The electrical ports 211, the actuator cavity 212, and the one or more pressure equalization recesses 213 in the inner surface 206 of the cover plate 202 may be formed by any suitable process known to those of ordinary skill in the art, a non-limiting example of which includes an etching process.

As shown in FIG. 15, the actuator 214 includes a plurality of actuator ribs 215 having a dead end rib region 216, an open end rib region 217, and a central rib region 218 joined in a herringbone pattern to a moveable central spine 219, and a displaceable actuator arm 220 operatively coupled to the spine 219. The intermediate plate 203 may also include one or more air flow passages 221 for purging air from the open end rib region 217 of the plurality of actuator ribs 215 and out of the pilot microvalve 102.

The actuator arm 220, which is operatively coupled to the spine 219, includes a pivot anchor or hinge 222 that bends or flexes to accommodate movement of the actuator arm 220 as it is arcuately displaced between actuated and un-actuated positions by movement of the spine 219 of the actuator 214. The arcuate movement of the actuator arm 220 occurs in and defines a plane that is parallel to the first surface 207 in the regions where the first surface 207 contacts the cover plate 202 and/or a plane that is parallel to the second surface 208 in the regions where the second surface 208 contacts the base plate 204. The hinge 222 is formed between the spine 219 and an air flow passage 221. The actuator arm 220 also includes a valve element 223 having slots 224 and 225 for controlling the flow of a fluid through the pilot microvalve 102, and a plurality of pressure equalization openings 226 for reducing or preventing pressure imbalances so as to minimize or prevent "out of plane" movement of the valve element 223 of the actuator arm 220 during actuation and un-actuation thereof.

The first surface 207 of the intermediate plate 203 may also include bond pads 207a arranged in bond pad regions which are located adjacent to the electrical ports 211 of the cover plate 202 when the pilot microvalve 102 is assembled. Upon assembly of the pilot microvalve 102, the bond pads 207a provide an electrical contact between electrical wires (not shown) bonded to the bond pads 207a and connected to a source of electrical power (not shown) and the plurality of actuator ribs 215 of the intermediate plate 203 for the purpose of passing an electrical current through the plurality of actuator ribs 215 during actuation or energization.

The inner surface 209 of the base plate 204 is shown in FIG. 16. In the illustrated embodiment, the inner surface 209 of the base plate 204 includes an actuator cavity 230 having one or more pressure equalization recessions or depressions 231 (e.g., troughs, receptacles) that diminish or prevent pressure imbalances during operation of the conventional microvalve device.

The actuator cavity 230 in the inner surface 209 of the base plate 204 may include an upper actuator arm cavity region 230a, a central actuator arm cavity region 230b, a lower actuator arm cavity region 230c, a dead end rib cavity region 230d, a central rib cavity region 230e, and an open end rib cavity region 230f. The base plate 204 further includes a plurality of fluid ports for permitting passage of fluid through the pilot microvalve 102, including a normally open fluid port 227, a normally closed fluid port 228, and a common fluid port 229. It will be understood however, that each of the respective fluid ports may be configured to be either normally opened or normally closed in the absence or presence of an electrical current passing through the plurality of actuator ribs 215.

When the intermediate plate 203 is assembled with the base plate 204, and the actuator arm 220 and the valve element 223 of the actuator 214 have not been actuated, the normally open fluid port 227 is in an open position and the normally closed fluid port 228 is in a closed position. In the open position, the slot 224 is positioned such that it overlaps a portion of the normally open fluid port 227, thereby allowing fluid flow between the normally open fluid port 227 and the common fluid port 229. When the normally closed fluid port 228 is in the closed position, the slot 225 is positioned away from the fluid port 228, thereby substantially preventing fluid flow between the fluid port 228 and the common fluid port 229.

During actuation of the pilot microvalve 102, the ribs 215 are heated by passing an electrical current therethrough. The ribs 215 then undergo thermal expansion and elongate, which urges the spine 219 and the attached actuator arm 220 away from the ribs 215 (to the right when viewing FIG. 15). The actuator arm 220 then bends or flexes at the hinge 222 to accommodate movement of the spine 219 thereby causing the valve element 223, and its slots 224 and 225 to move in the plane of normal motion along an arcuate path (to the right when viewing FIG. 15) to a stressed position which closes the normally open fluid port 227 and opens the normally closed fluid port 228.

When the electrical current is removed from the ribs 215, the ribs 215 cool and contract, urging the central spine 219 back toward the ribs 215 (to the left when viewing FIG. 15). The actuator arm 220 and valve element 223 then return to the un-actuated position, wherein the normally open fluid port 227 is again open, and the normally closed fluid port 228 is again closed.

FIGS. 17 through 21 illustrate portions of the piloted microvalve 104. The illustrated microvalve 104 is a pilot operated pressure control three-port plate microvalve. One embodiment of a microvalve device suitable for use as the piloted microvalve 104 is described in U.S. patent application Ser. No. 14/743,078, the disclosure of which is incorporated in its entirety herein.

Figure 17:
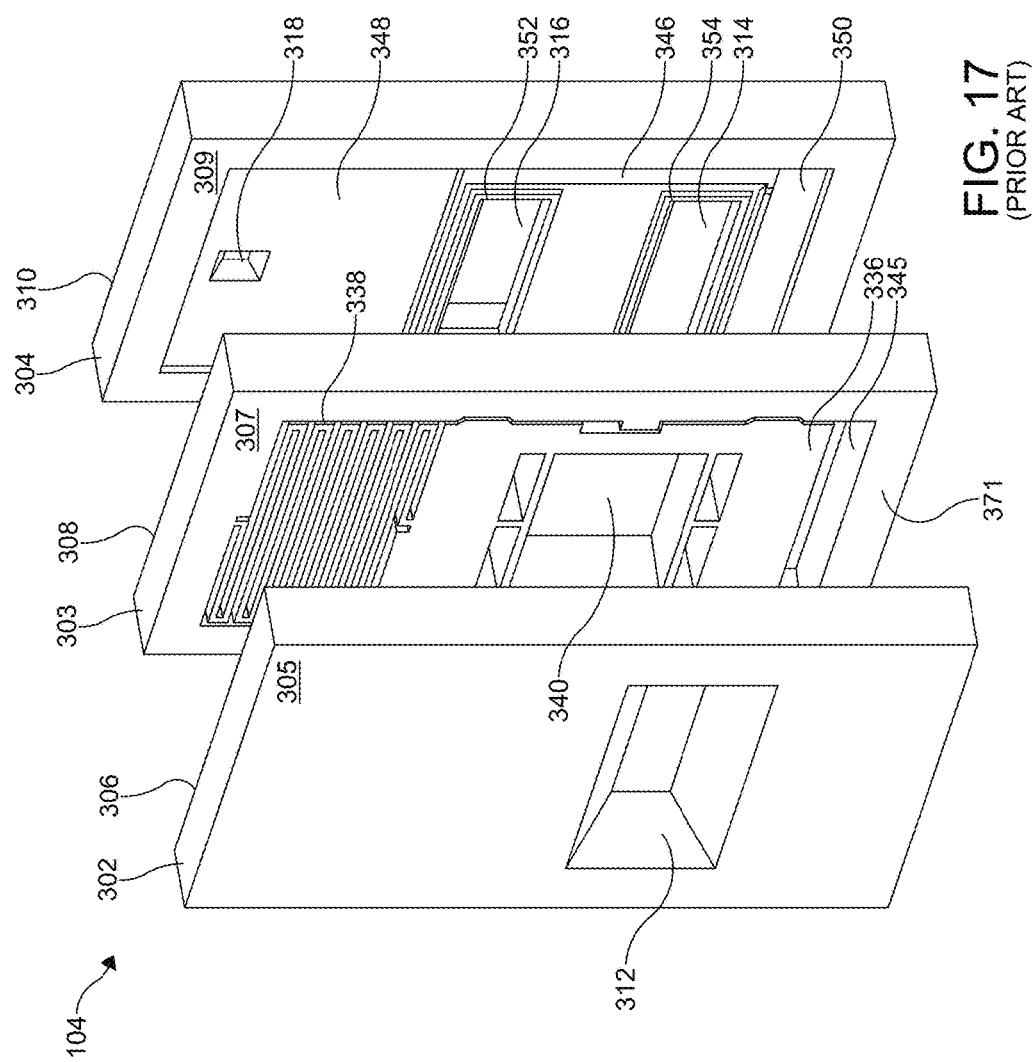
FIG. 17 is an exploded perspective view of a known pilot operated three-port plate microvalve.

As shown in FIG. 17, the piloted microvalve 104 includes a cover plate 302, an intermediate plate 303, and a port or base plate 304. The cover plate 302 has an outer surface 305 and an inner surface 306. The cover plate 302 also has a common port 312 formed therethrough. The intermediate plate 303 has a first surface 307 and a second surface 308. The base plate 304 has an inner surface 309 and an outer surface 310. The base plate 304 also has a normally closed valve port 314, a normally open valve port 316, and a control port 318 formed therethrough.

When the piloted microvalve 104 is assembled, the inner surface 306 of the cover plate 302 engages the first surface 307 of a non-movable portion 371 of the intermediate plate 303, and the inner surface 309 of the base plate 304 engages the second surface 308 of the non-movable portion 371 of the intermediate plate 303. The cover plate 302, the intermediate plate 303, and the base plate 304 may be retained in this orientation in any desired manner. For example, portions of the cover plate 302 and/or the base plate 304 may be bonded to non-movable portions of the intermediate plate 303 by any of the methods described above for bonding the component plates of the piloted microvalve 104. The cover plate 302, the intermediate plate 303, and the base plate 304 may be composed of any desired material or combination of materials, such as silicon, single crystal silicon, and/or similar materials.

The structure of the inner surface 306 of the cover plate 302 is illustrated in detail in FIG. 21. As shown therein, the cover plate 302 includes a first recessed region 322, a second recessed or control region 324, and a third recessed region 326 provided on the inner surface 306 thereof. The common port 312 is formed through the first recessed region 322. First and second pressure equalization troughs 328 and 329 are also formed on the inner surface 306 within the first recessed region 322.

The cover plate 302 also includes a first sealing structure 330 that extends from the bottom surface of the first recessed region 322 and completely about the perimeter of the first pressure equalization trough 328, and a second sealing structure 332 that also extends from the bottom surface of the first recessed region 322 and completely about the perimeter of the second pressure equalization trough 329. A third sealing structure 334 extends from the bottom surface of the first recessed region 322 and completely about a perimeter of the first recessed region 322. Channels 335 are formed in the inner surface 306 of the cover plate 302 and through a portion of the third sealing structure 334. The channels 335 provide fluid communication between the first recessed region 322 and the third region 326 and define feedback ports. In the embodiment illustrated, two channels 335 are shown. Alternatively, any desired number of channels 335 may be provided, including one channel 335 and three or more channels 335.

The structure of the intermediate plate 303 is illustrated in detail in FIGS. 17, 19, and 20. As shown therein, a wide and preferably rectangular plate opening 370 is formed in the intermediate plate 303.

The plate opening 370 has a first end 374 and a second end 376 opposite the first end 374. Each of the walls 370a and 370b of the plate opening 370 that extend between the first end 374 and the second end 376 has a plurality of outwardly extending recesses 378 formed therein, the purpose of which will be described below. A pair of inwardly extending tabs 372 are also formed in the walls 370a and 370b intermediate the first end 374 and the second end 376 of the plate opening 370.

The intermediate plate 303 further includes a moveable portion configured as a displaceable member or plate 336 disposed in the plate opening 370 between the first and second ends 374 and 376 of the plate opening 370. The displaceable plate 336 is generally rectangular with a first end 336a disposed nearest the first end 374 of the plate opening 370 and defining an axis A. The displaceable plate 336 has a second end 336b disposed nearest the second end 376 of the plate opening 370.

The displaceable plate 336 is movable between a maintaining position (not shown), wherein the normally closed valve port 314 and the normally open valve port 316 are closed, a first position wherein the second end 336b is spaced apart from the second end 376 of the plate opening 370, as shown in FIG. 19, and a second position wherein the second end 336b is adjacent the second end 376 of the plate opening 370, as best shown in FIG. 20.

The displaceable plate 336 has a relatively large and centrally formed fluid flow opening 340 formed therethrough. Pressure balance ports 344 are also formed through the displaceable plate 336 adjacent the fluid flow opening 340.

The displaceable plate 336 further has a plurality of protrusions 380 defined on side walls thereof. Each of the protrusions 380 is aligned with a corresponding one of the recesses 378 formed in the walls of the plate opening 370 when the displaceable plate 336 is in the first position, as shown in FIG. 19. When the protrusions 380 are aligned with the recesses 378, a leak path between the protrusions 380 and the recesses 378 is minimized. The protrusions 380 are sufficiently shallow; i.e., have a minimal thickness, so as not to interfere with the travel of the displaceable plate 336 within the plate opening 370. However, when the displaceable plate 336 is out of the first position, the outwardly extending protrusions 380 on the displaceable plate 336 are no longer aligned with the corresponding outwardly extending recesses 378, and the protrusions 380 are closer and have a reduced clearance relative to the non-recessed portions of the walls of the plate opening 370.

A pair of notches 342 is also formed in the side walls of the displaceable plate 336 intermediate the first and second ends, 336a and 336b, respectively. Each of the notches 342 is aligned with a corresponding one of the tabs 372 formed in the walls 370a and 370b of the plate opening 370. The tabs 372 define stop surfaces that limit travel of the displaceable plate 336 between the first position and the second position.

The intermediate plate 303 also includes a convoluted spring 338, disposed in the plate opening 370. The convoluted spring 338 moveably connects the non-movable portion 371 of the intermediate plate 303 to the displaceable plate 336, and preferably biases the displaceable plate 336 to the first position. The convoluted spring 338 also retains the displaceable plate 336 in the plate opening 370, simplifying handling of the intermediate plate 303 during manufacture. A variable volume region 345 is defined between the displaceable plate 336 and the second end 376 of the plate opening 370 when the displaceable plate 336 is in the first position.

The structure of the inner surface 309 of the base plate 304 is illustrated in detail in FIG. 18. As shown therein, the base plate 304 includes a first recessed region 346, a second recessed or control region 348, and a third recessed region 350 provided on the inner surface 309 thereof. The normally closed valve port 314 and the normally open valve port 316 are formed through the first recessed region 346, and the control port 318 is formed and the second feedback port 316 is formed through the second recessed region 348.

The base plate 304 also includes a first sealing structure 352 that extends from the bottom surface of the first recessed region 346 and completely about the perimeter of the normally open valve port 316. A second sealing structure 354 also extends from the bottom surface of the first recessed region 346 and completely about a perimeter of the normally closed valve port 314. A third sealing structure 356 extends from the bottom surface of the first recessed region 346 and completely about the perimeter of the first recessed region 346. Channels 349 are formed in the inner surface 309 of the base plate 304 and through a portion of the third sealing structure 356. The channels 349 provide fluid communication between the first recessed region 346 and the third region 350 and define feedback ports. In the embodiment illustrated, two channels 349 are shown. Alternatively, any desired number of channels 349 may be provided, including one channel 349 and three or more channels 349.

The operation of the pilot operated plate piloted microvalve 104 described herein is similar to the pilot operated plate microvalves disclosed in U.S. Pat. No. 8,113,482 to Hunnicutt. U.S. Pat. No. 8,113,482 to Hunnicutt, the disclosure of which is incorporated herein in its entirety by reference, describes the structure and operation of a plurality of embodiments of known pilot operated pressure control plate microvalves.

During use, the piloted microvalve 104 may be operated in a conventional manner (or otherwise) to selectively move the displaceable plate 336 from the maintaining position to either the first position (illustrated in FIG. 19), wherein the normally closed valve port 314 is closed and the normally open valve port 316 is at least partially open, and the second position (illustrated in FIG. 20), wherein the normally closed valve port 314 is at least partially open and the normally open valve port 316 is closed. When the displaceable plate 336 is located in the first position, it is desirable that as little fluid as possible flows through the normally closed valve port 314. Likewise, when the displaceable plate 336 is located in the second position, it is desirable that as little fluid as possible flows through the normally open valve port 316. Similarly, when the displaceable plate 336 is in the maintaining position, it is desirable that as little fluid as possible flows through the normally closed valve port 314 and the normally open valve port 316. This is accomplished by providing the first sealing structure 352 that extends from the bottom surface of the first recessed region 346 and completely about the perimeter of the normally open valve port 316, the second sealing structure 354 that extends from the bottom surface of the first recessed region 346 and completely about the perimeter of the normally closed valve port 314, the first sealing structure 330 that extends from the bottom surface of the first recessed region 322 and completely about the perimeter of the first pressure equalization trough 328, and the second sealing structure 332 that also extends from the bottom surface of the first recessed region 322 and completely about the perimeter of the second pressure equalization trough 329.

In a typical application, the normally closed valve port 314 is connected to a source of pressurized fluid 362, such as a pump, an accumulator, or any other device that provides pressurized fluid. The common port 312 is a load port configured to supply fluid to a load 366, such as a transmission clutch or brake, and other hydraulic actuators. The normally open valve port 316 may be connected to a destination device 364, such as a fluid reservoir, a pump suction port, or a fluid accumulator.

The principle and mode of operation of the invention have been described in its preferred embodiments. However, it should be noted that the invention described herein may be practiced otherwise than as specifically illustrated and described without departing from its scope.

What is claimed is:

1. A two-stage control microvalve comprising:
a generally cylindrical housing configured for insertion into a bore in a body of a hydro-mechanical valve system, wherein the housing includes a pilot stage body and a second stage body attached to the pilot stage body;
a pilot microvalve mounted within the pilot stage body, the pilot stage body having a first cap defining a first end thereof and a second end closed by a closing member, the cap having an opening formed therein and defining a flow path for fluid from the pilot microvalve, wherein a first fluid passageway extends from an outside surface of the pilot stage body to a first fluid port of the pilot microvalve and provides fluid communication between a source of pressurized fluid and the pilot microvalve; and
a piloted microvalve mounted within the second stage body and in fluid communication with the pilot microvalve, the second stage body having a second cap defining a first end thereof, and a second end defining a cavity configured to receive the first end of the pilot stage body, the second cap having an opening formed therein and defining a flow path for fluid from the piloted microvalve, wherein a fluid passageway extends from the second end of the second stage body to the piloted microvalve;

wherein the pilot stage body includes a second fluid passageway formed therein, the second fluid passageway extending from the outside surface of the pilot stage body to a second fluid port of the pilot microvalve, and wherein the second fluid passageway provides fluid communication between the pilot microvalve and the source of pressurized fluid; and wherein the pilot stage body and the second stage body are configured to be independently assembled such that the pilot stage body and the pilot microvalve mounted therein, and the second stage body and the piloted microvalve mounted therein, may be functionally tested prior to being attached together to define the housing.

2. The two-stage control microvalve according to claim 1, wherein the hydro-mechanical valve system is a vehicle transmission.

3. The two-stage control microvalve according to claim 1, wherein a fluid tight seal is defined between the cavity formed in the second end of the second stage body and the first end of the pilot stage body mounted therein.

4. The two-stage control microvalve according to claim 1, wherein the fluid passageway that extends from the second end of the second stage body to the piloted microvalve is a third fluid passageway, the third fluid passageway providing fluid communication between the pilot microvalve and a control port of the piloted microvalve.

5. The two-stage control microvalve according to claim 4, wherein the second stage body includes a fourth fluid passageway formed therein, the fourth fluid passageway extending radially through the second stage body and is in fluid communication with a first fluid port of the piloted microvalve, and wherein the fourth fluid passageway provides fluid communication from the piloted microvalve to the source of pressurized fluid.

6. The two-stage control microvalve according to claim 5, wherein the second stage body includes a fifth fluid passageway formed therein, the fifth fluid passageway extending from an opening in the second stage body to a second fluid port of the piloted microvalve, and wherein the fifth fluid passageway provides fluid communication from the source of pressurized fluid to the piloted microvalve.

7. The two-stage control microvalve according to claim 1, wherein the pilot microvalve is a 3-port proportional pressure control valve.

8. A housing in combination with a two-stage control microvalve, the housing comprising a generally cylindrical housing body having a cavity formed therein and configured for insertion into a bore in a body of a hydro-mechanical valve system;

wherein the two-stage control microvalve is mounted within the housing body;

wherein the two-stage control microvalve includes a pilot microvalve in fluid communication with a piloted microvalve;

wherein the housing body includes:

a first stage body having a first end and a second end, the first stage body having a first cap defining the first end thereof and the second end closed by a closing member, the cap having an opening formed therein and defining a flow path for fluid from the pilot microvalve mounted therein, wherein a first fluid passageway extends from an outside surface of the first stage body to a first fluid port of the pilot microvalve and provides fluid communication between a source of pressurized fluid and the pilot microvalve; and a second stage body having a first end and a second end, the second stage body having a second cap defining the first end thereof and the second end defining a cavity, the second cap having an opening formed therein and defining a flow path for fluid from the piloted microvalve mounted therein, wherein a fluid passageway extends from the second end of the second stage body to the piloted microvalve;

wherein the first stage body includes a second fluid passageway formed therein, the second fluid passageway extending from the outside surface of the first stage body to a second fluid port of the pilot microvalve, and wherein the second fluid passageway provides fluid communication between the pilot microvalve and the source of pressurized fluid;

wherein the first end of the first stage body is attached within the cavity of the second end of the second stage body; and wherein the first stage body and the second stage body are configured to be independently assembled such that the first stage body and the pilot microvalve mounted therein, and the second stage body and the piloted microvalve mounted therein, may be functionally tested prior to being attached together to define the housing.

9. The housing in combination with a two-stage control microvalve according to claim 8, wherein a fluid tight seal is defined between the cavity formed in the second end of the second stage body and the first end of the first stage body attached therein.

10. The two-stage control microvalve according to claim 8, wherein the pilot microvalve is a 3-port proportional pressure control valve.

11. The two-stage control microvalve according to claim 8, wherein the fluid passageway that extends from the second end of the second stage body to the piloted microvalve is a third fluid passageway, the third fluid passageway providing fluid communication between the pilot microvalve and a control port of the piloted microvalve.

* * * * *